Figure 1:
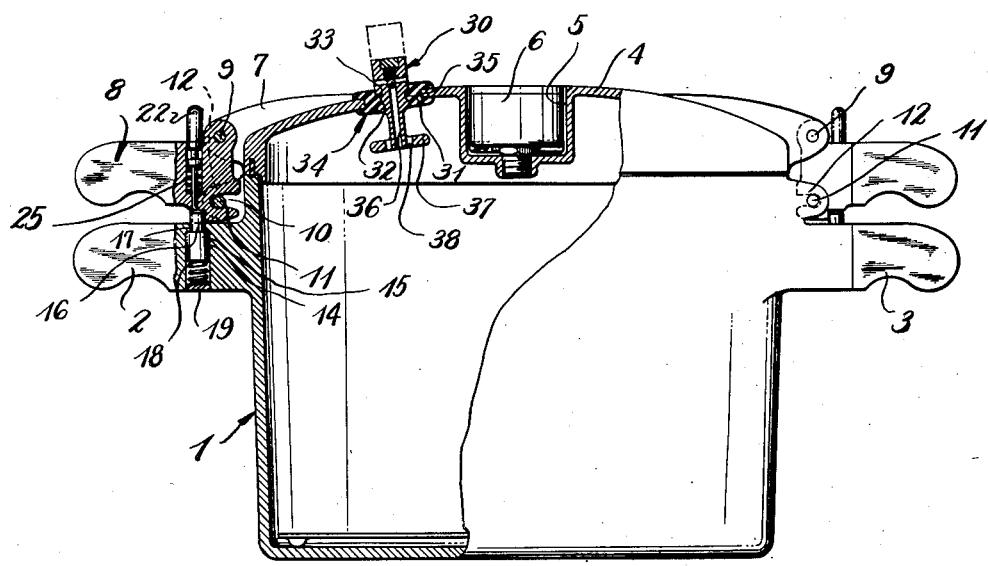

March 7, 1950 A. H. KURILOFF 2,499,828
LATCH
Filed May 14, 1946

INVENTOR.
ARTHUR H. KURILOFF
BY Harold W. Mattingly
Attorney

Patented Mar. 7, 1950

2,499,828

UNITED STATES PATENT OFFICE 2,499,828

LATCH

Arthur H. Kuriloff, Los Angeles, Calif.

Application May 14, 1946, Serial No. 669,690

3 Claims. (Cl. 292—106)

My invention relates to a pressure vessel and has particular reference to an improved construction of that class of pressure vessels known as pressure cookers.

Pressure cookers intended for home use must be so constructed as to provide a maximum of safety, be simple to operate and use, and so designed as to minimize the likelihood of the apparatus getting out of order and requiring repairs.

Pressure vessels commonly used prior to my invention oftentimes failed to supply the above noted desiderata in that with many types of pressure cookers a complicated system of screws and clamps were employed to hold the cover in place. The cover latch for a pressure cooker should be double-latched or latched and locked so as to positively prevent inadvertent unlatching of the cover and require two unlike conscious operations in order to release the cover. Furthermore, the mechanism should be simple and should be so constructed that the operations of closing the vessel and opening the same will be natural movements which are simple to execute.

Pressure cookers are ordinarily equipped with a pressure relief valve which operates to maintain a constant operating pressure within the vessel during use. A blow-out plug is usually provided which will melt out or blow out in the event the pressure relief valve fails to operate satisfactorily and dangerously high pressures are developed within the vessel. In conventional constructions these blow-out plugs are formed of a soft metal such as "Wood's" metal or solder so that the plug is destroyed whenever it is blown out. This requires the cooker to be returned to the factory or a service station for repair whenever the safety device operates.

It is, therefore, an object of my invention to provide a pressure vessel which overcomes the above noted disadvantages by incorporating a new quick acting closure latch which is double-locked to require two unlike conscious operations before the closure is released.

It is also an object of my invention to provide a pressure vessel of the character set forth in the preceding paragraph in which the second or safety lock engages automatically upon operation of the main closure latch but which requires a separate manual operation.

It is an additional object of my invention to provide a pressure vessel of the character set forth in the preceding paragraphs which includes a spring-pressed lock member for engaging and holding the main closure latch in its closed position.

It is a still further object of my invention to provide a pressure vessel of the character set forth hereinbefore which includes a novel compression seal between the closure and the body of the vessel.

It is also an object of my invention to provide a pressure vessel of the character set forth in the preceding paragraphs which includes a pressure relief valve mounted in the vessel in a highly elastic mounting ring so that under excessive pressure conditions, the force exerted on said resilient mounting ring will temporarily deform the same sufficiently to allow the relief valve to be blown out of the ring but is retained on the vessel.

Figure 2:
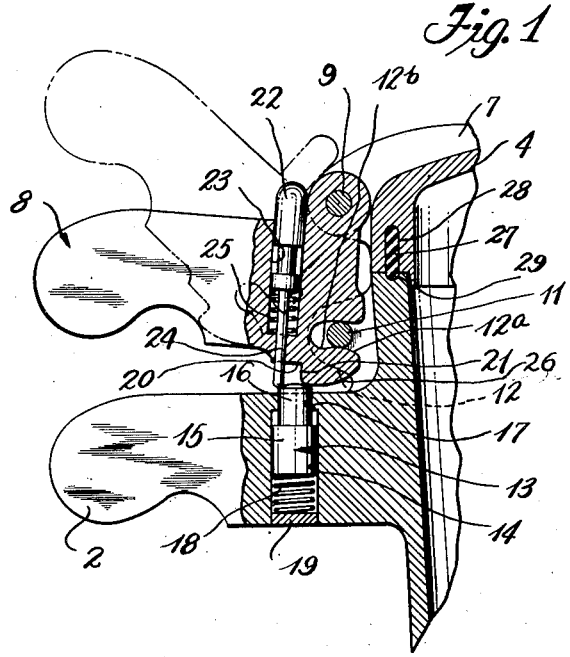

Other objects and advantages of my invention will be apparent from a study of the following specifications, read in connection with the accompanying drawings, wherein:

Fig. 1 is a side elevational view of the preferred embodiment of my invention with parts broken away and other parts shown in section to illustrate the details of construction; and Fig. 2 is an enlarged fragmentary sectional view illustrating the details of construction of the closure latch and lock mechanism and illustrating by means of dotted lines the mode of operation of the latch.

Referring to the drawings, I have illustrated in Fig. 1 the preferred embodiment of my invention as comprising a pressure cooker of the character ordinarily intended for home use. Such a pressure cooker may comprise a body 1 of pot or kettle-like form, to the upper edge of which is secured or formed integrally with the body a pair of outwardly extending handles 2 and 3. The open top of the body 1 is adapted to be closed by a dome-like closure 4 which may be formed with a recess as shown at 5 for the mounting of a pressure gauge 6.

At diametrically opposed positions on the closure 4, I form outwardly extending flanges or pairs of ears 7, each of the ears of a pair being spaced apart to receive therebetween a latch member 8. The latch member 8 is pivotally mounted between the ears 7 as by means of a pivot shaft mutually inter-engaging the ears 7 and the latch member 8.

The latch member 8 has formed therein a slot 10. The slot 10 is adapted to receive in the closed position of the latch member 8 a latch pin 11 which is secured to the body 1 as by means of a pair of outwardly extending ears 12 formed integrally with the body 1. The latch member 8 is, by reason of the hinge pin 9, mounted for movement from a latched position such as that illustrated in Fig. 1 to a released position such as that illustrated by dotted lines in Fig. 2, in which latter position the closure is disengaged from the body and is free to be lifted from the body 1, the latch members 8 being preferably formed as shown in Fig. 1 in the shape of handles to facilitate the operation of removing the closure.

In the latched position of the latch members 8 the slot 10 receives the pin 11. In order that movement of the latch member 8 to the latched position may tightly clamp the closure to the body of the vessel, the lower surface of the slot 10 is inclined as indicated at 12a. The innermost portion of the slot is oppositely inclined to form a depression 12b for receiving the pin 11 when the latch member 8 is moved to the fully latched position. With this construction the engagement of the sloping surface 12a with the latch pin 11 moves the closure downwardly as the latch member 8 is moved toward the latched position. In the latched position, the latch pin 11 is received within the depression 12b, with the result that upwardly directed forces applied to the closure and transmitted to the latch pin 11 do not produce any couple tending to rotate the latch member 8 away from the latched position.

This reverse sloping of surface 12b also provides an additional safety factor in that should the attempt be made to unlatch the closure while there is steam pressure above atmospheric within the vessel, a large and unusual amount of force would be required to swing latch 8 about its pivotal point pin 9 against the interference provided by the raised portion of material at the intersection of surfaces 12a and 12b.

However, in order that any possibility of an inadvertent unlatching of the closure be entirely avoided, I provide a spring-pressed lock member 13 which may be received within a bore 14 formed in the handle member 2. The member 13 preferably includes a large diameter guiding portion 15 from which rises a locking portion 16 of smaller diameter. The portion 16 is passed through a smaller diameter portion 17 of the bore 14 so that engagement of the respective shoulders limits the extent of the upward movement of the lock member 13 to the position which is illustrated in Fig. 1. A spring 18 placed within the bore 14 below the lock member 13 and held in place by a plug 19 driven into the lower end of the bore 14 serves to normally urge the lock member 13 to the locked position which is shown in Fig. 1.

The lock member 13 is positioned to dispose the locking portion 16 thereof within a notch 20 formed on the underside of the latch member 8 when the latch member is in the latched position. The notch 20 is characterized by a vertical face 21 which is disposed substantially parallel to the peripheral surface of the portion 16 so that in the latched and locked position shown in Fig. 1 pivotal movement of the latch member 8 is positively prevented.

The lock member 13 is adapted to be released by a lock operator 22 which is made in the form of a plunger slidably mounted within a bore 23 provided in the latch member 8, the lock operator 22 being so positioned as to align a lock member engaging pin portion 24 thereof with the lock member 13 when the parts are in the position shown in Fig. 1. A compression spring 25 placed beneath the plunger 22 serves to normally urge the same upwardly to the position which is shown in Fig. 1.

It will be seen that with the parts positioned as shown in Fig. 1 a depression of the lock operator 22 will depress the lock member 13 to such position as that shown in single lines in Fig. 2, disposing the portion 16 below the notch 21 and freeing the latch member 8 for pivotal movement toward a released position. When the closure is installed, the converse sequence of operations occurs. Interference between the latch member and the lock member during the closing operation is prevented by providing on the latch member 8 a curved or inclined surface 26 adjacent the notch face 21 and arranged to engage the upper surface of the lock member 13 and depress the same as the latch member 8 is rotated from the released to the latched positions thereof.

It will be seen that the operation of installing the closure on the vessel is one which requires only normal and natural movements, the closure being carried by the latch members 8 which function as handles for this purpose. The closure is placed in its proper position on the body of the vessel and the latch members 8 then forced downwardly to cause the latch pins 11 to be received within the slots 10 and to cause the lock members 13 to engage the notches 20. Removal of the closure is accomplished by placing the fingers under the lacth members 8 and depressing the lock operator 22 with the thumb. This frees the latch members for pivotal rotation to their released positions, whereupon they thereby act as handles to remove the closure from the vessel.

In the construction illustrated in the drawings I have shown a sealing member 27 for establishing a steam-tight seal between the closure and the body of the vessel 1. The sealing member 27 is preferably formed of rubber or like incompressible or like elastic material and is made in the form of a ring in a relatively thin, wide ribbon of the selected material. The ribbon is disposed with its width extending axially of the ring and is received within a slot 28 formed in the closure 4, the slot 28 having a width substantially equal to the thickness of the ribbon material and having a depth only slightly less than the width of the ribbon material so that only a small portion, such as is shown at 29, extends below the surface of the closure 4. This portion may bear against a flat upper surface of the vessel 1 or, as in the preferred embodiment of my invention, preferably received within a shallow groove formed on the upper surface of the vessel. I have found that with this construction the sealing member 27 is always permanently associated with the closure 1 and that difficulties resulting from the undesired separation of the sealing ring from the closure are completely avoided. At the same time an excellent seal adequate for holding the normal operating pressure is achieved.

The pressure vessel of my invention preferably includes a novel relief valve and blow-out plug construction which is illustrated in Fig. 1. As is shown therein I provide a relief valve which is indicated generally by the reference character 30 and which comprises a cylindrical body member within which is mounted a pressure relief valve mechanism of any suitable construction, there being illustrated in Fig. 1 a spring-pressed ball type such as is commonly used in relief valves.

This valve is ordinarily urged to open at the normal operating pressure of the vessel, usually in the neighborhood of fifteen pounds per square inch. The valve body 30 is characterized by an annular groove 31 which receives a similar annular ring 32 formed around the interior of an opening 33 provided in a relief valve carrier indicated generally at 34. The relief valve carrier 34 is preferably formed as a grommet of rubber or like highly elastic material and is mounted grommet fashion in an aperture 35 provided in the closure 4.

I have found that with this construction the stiffness of the rubber and the depth of the groove 31 may be adjusted in such wise as to retain the relief valve body 30 under the normal operating pressure of about fifteen pounds per square inch but that when pressures exceeding about twenty-five pounds per square inch are reached, the valve body 30 will be urged from the opening 33 in the grommet 34.

To prevent the relief valve body from being forcibly ejected from the opening in the grommet 34, I preferably form the lower portion of the body 30 as a stem 36 having a diameter less than the diameter of the grommet hole 33 and carrying on its innermost end a head member 37 which has a diameter somewhat exceeding the diameter of the hole 33. By-pass ports 38 are formed in the head member 37 to prevent the head member 37 from sealing off the opening through the grommet 34 when the valve body 30 is moved to an upper position such as that illustrated by dotted lines in Fig. 1.

It will be noted that with this construction the relief valve body may be readily replaced within the grommet once the internal pressure is relieved and that it is not necessary to solder or sweat in a blow-out plug as is required by conventional constructions. Furthermore, the grommet mounting for the valve body 30 permits the ready changing of relief valves in the event the valve in use requires repair or maintenance.

From the foregoing it will be observed that I have provided a novel pressure vessel construction which is characterized particularly by the novel relief valve and blow-out plug construction, the new closure seal, and the new mechanism for latching and locking the closure in place on the body of the pressure vessel.

Attention is directed particularly to the latch and lock arrangement which permits the cover to be installed with a single, simple, natural operation but which requires two unlike conscious operations to release the closure from the vessel.

While I have shown and described the preferred embodiment of my invention, I do not desire to be limited to any of the details of construction shown or described herein, except as defined in the appended claims.

I claim:

1. In a pressure vessel including a body and a separate closure member, a closure lock comprising a latch member; pivot means hingedly securing said latch member to said closure; a latch pin carried by said body, said latch member having formed therein a slot defining a latching surface for engaging said latch pin and moving said closure member and body toward each other during movement of said latch member toward a latched position and including a depressed portion for receiving said latch pin in said latched position, said latch member having also formed therein a notch defining a locking surface disposed substantially at right angles to said latching surface; a spring-pressed lock member mounted on said body in a position to enter said notch in said latched position of said latch member; a lock operator carried by said latch member in a position to engage said lock member in said latched position of said latch member; and means mounting said lock operator for movement in a direction to move said lock member out of said notch.

2. In a pressure vessel including a body and a separate closure member, a closure lock comprising a latch member; pivot means hingedly securing said latch member to said closure; a latch pin carried by said body, said latch member having formed therein a slot defining a latching surface for engaging said latch pin and moving said closure member and body toward each other during movement of said latch member toward a latched position and including a depressed portion for receiving said latch pin in said latched position, said latch member having also formed therein a notch defining a locking surface disposed substantially at right angles to said latching surface; a spring-pressed lock member mounted on said body in a position to enter said notch in said latched position of said latch member; a lock operator carried by said latch member in a position to engage said lock member in said latched position of said latch member; and means mounting said lock operator for movement in a direction to move said lock member out of said notch toward a released position, said latch member having formed thereon an inclined surface adjacent to said notch for engaging and moving said lock member to said released position as said latch member is moved toward said latched position.

3. In a pressure vessel including a body and a separate closure member, a closure lock comprising: a latch member; pivot means hingedly securing said latch member to said closure cover; a latch pin carried by said body member, said latch member having formed therein a slot defining a latching surface for engaging said latch pin and moving said closure cover and body toward each other during movement of said latch member toward a latched position and including a depressed portion for receiving said latch pin in a latched position, said latch member also having formed therein a notch defining a locking surface disposed substantially at right angles to said latching surface; a spring pressed lock member mounted on said body in a position to enter said notch in said latched position of said latch member; a lock operator carried by said latch member in a position to engage said lock member in said latched position of said latch member; and means mounting said lock operator for movement in a direction to move said lock member out of said notch.

ARTHUR H. KURILOFF.

REFERENCES CITED

The following references are of record in the file of this patent:

UNITED STATES PATENTS

| Number | Name | Date |
|---|---|---|
| 385,668 | Henninger | July 3, 1888 |
| 711,696 | Cook | Oct. 21, 1902 |
| 1,160,758 | Reinke | Nov. 16, 1915 |
| 1,226,597 | Re | May 15, 1917 |
| 1,559,594 | Wentorf et al. | Nov. 3, 1925 |
| 1,569,187 | Jewell | Jan. 12, 1926 |
| 1,641,681 | Kircher | Sept. 6, 1927 |
| 2,051,100 | Nelson | Aug. 18, 1936 |
| 2,107,704 | Kronquest | Feb. 8, 1938 |
| 2,209,693 | Hammell | July 30, 1940 |
| 2,354,927 | Propernick | Aug. 1, 1944 |
| 2,376,593 | Hellen | May 22, 1945 |
| 2,389,118 | Buehner | Nov. 20, 1945 |